United States Patent
Zhang et al.

(10) Patent No.: US 11,200,201 B2
(45) Date of Patent: Dec. 14, 2021

(54) METADATA STORAGE METHOD, DEVICE AND SERVER

(71) Applicant: Baidu Online Network Technology (Beijing) Co., Ltd, Beijing (CN)

(72) Inventors: Wenxin Zhang, Beijing (CN); Yunhao Zhang, Beijing (CN); Chi Chen, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 284 days.

(21) Appl. No.: 16/116,676

(22) Filed: Aug. 29, 2018

(65) Prior Publication Data

US 2019/0197123 A1 Jun. 27, 2019

(30) Foreign Application Priority Data

Dec. 21, 2017 (CN) .......................... 201711396330.7

(51) Int. Cl.
*G06F 16/30* (2019.01)
*G06F 16/14* (2019.01)
*G06F 16/16* (2019.01)
*G06F 16/178* (2019.01)
(Continued)

(52) U.S. Cl.
CPC ............ *G06F 16/14* (2019.01); *G06F 16/164* (2019.01); *G06F 16/178* (2019.01); *G06F 16/907* (2019.01); *G06F 16/953* (2019.01)

(58) Field of Classification Search
CPC ...... G06F 16/14; G06F 16/164; G06F 16/178; G06F 16/907; G06F 16/953
See application file for complete search history.

(56) References Cited

U.S. PATENT DOCUMENTS

2005/0289111 A1* 12/2005 Tribble ............. G06F 16/90335
2006/0007466 A1* 1/2006 Ben-Yehuda ......... G06F 40/154
358/1.13
(Continued)

FOREIGN PATENT DOCUMENTS

CN 101187938 A 5/2008
CN 101908052 A 12/2010
(Continued)

OTHER PUBLICATIONS

Notification of the First Office Action dated Dec. 19, 2019 for Chinese Application No. 201711396330.7.
(Continued)

*Primary Examiner* — Mahesh H Dwivedi
(74) *Attorney, Agent, or Firm* — Akerman LLP

(57) ABSTRACT

A metadata storage method, device, and a server are disclosed. The method includes: obtaining a metadata to be processed from the preset metadata storage system or from external of the preset metadata storage system; determining a type of metadata to be processed; processing the metadata to be processed to obtain a new metadata in a storage format corresponding to the type of metadata to be processed, wherein the storage formats correspond to different types of metadata to be processed and comprise at least one identical information kind for different types of metadata; and storing the new metadata in the preset metadata storage system. Thus a search for a metadata can be performed through a unified interface in a search engine, which is convenient to use.

13 Claims, 6 Drawing Sheets

(51) Int. Cl.
*G06F 16/907* (2019.01)
*G06F 16/953* (2019.01)

(56) References Cited

U.S. PATENT DOCUMENTS

| | | | | |
|---|---|---|---|---|
| 2008/0065699 | A1* | 3/2008 | Bloebaum | G06F 16/2471 |
| 2009/0024596 | A1* | 1/2009 | Basso | G06F 16/48 |
| 2009/0112808 | A1* | 4/2009 | Howcroft | G06F 16/48 |
| 2010/0095202 | A1* | 4/2010 | Ishizuka | G06F 40/186 |
| | | | | 715/255 |
| 2013/0117147 | A1* | 5/2013 | Ackerman | G06Q 30/02 |
| | | | | 705/26.7 |
| 2014/0074894 | A1* | 3/2014 | Han | H04N 21/2353 |
| | | | | 707/803 |
| 2014/0279979 | A1 | 9/2014 | Yost et al. | |
| 2019/0132270 | A1* | 5/2019 | Jawaharlal | G06F 16/24575 |
| 2019/0317919 | A1* | 10/2019 | Park | G06F 16/14 |

FOREIGN PATENT DOCUMENTS

| | | | |
|---|---|---|---|
| CN | 101945126 A | 1/2011 | |
| CN | 103150332 A | 6/2013 | |
| CN | 103312791 A | 9/2013 | |
| CN | 103440288 A | 12/2013 | |
| CN | 103984761 A | 8/2014 | |
| CN | 104461404 A | 3/2015 | |
| CN | 104751280 A | 7/2015 | |
| CN | 105701181 A | 6/2016 | |
| CN | 105740469 A | 7/2016 | |
| CN | 106611053 A | 5/2017 | |
| CN | 107066499 A | 8/2017 | |
| CN | 107203574 A | 9/2017 | |
| CN | 107491476 A | 12/2017 | |
| EP | 1361506 A2 * | 11/2003 | G09G 5/02 |

OTHER PUBLICATIONS

Search Report dated Dec. 9, 2019 for Chinese Application No. 201711396330.7.
Second Office Action dated Jun. 17, 2020 in connection with corresponding Chinese Patent Application No. 201711396330.7.
Search Report dated Jun. 9, 2020 in connection with corresponding Chinese Patent Application No. 201711396330.7.

* cited by examiner

METADATA STORAGE METHOD, DEVICE AND SERVER

The present application claims the benefit of priority to Chinese patent application No. 201711396330.7, filed before the State Intellectual Property Office on Dec. 21, 2017, and entitled "Metadata Storage Method, Device and Server", which is incorporated in the present application by reference in its entirety.

TECHNICAL FIELD

The present application relates to the Internet field, and in particular, to a metadata storage method, a metadata storage device and a server.

BACKGROUNDS

At present, people's life is more convenient with development of science and technology. Electronic products are used in a wide range, so that large quantity of data is generated. Especially in the Internet field, the analysis and processing of big data has become one of the focuses of current technologies.

Because of the huge amount of data, using the metadata becomes a convenient way to store and manage data. The metadata is a kind of data that describes other data, or a kind of structural data that is used to provide information related a certain resource. The metadata is a kind of data that each describes objections such as information resources or data. By using the metadata, resources may be identified and evaluated, a change of resources in a usage process may be tracked, large amounts of networking data may be managed simply and efficiently, so as to find, look up, integrate information and resource effectively, and, and manage the used resource efficiently.

With the prevailing of big data, the amount of metadata has also been increased. How to manage storage and metadata effectively and conveniently is becoming an urgent problem to be solved.

Currently, the metadata is stored in many storage systems. One type of metadata is stored in a respective storage system. In addition, the current search engine can only access one metadata storage system. When searching data, the query engine needs to be modified, for example, by adding multiple interfaces, which is inconvenient in use.

SUMMARY

A metadata storage method and device, a server, and a computer-readable storage medium are provided according to embodiments of the present application, so as to at least solve the above technical problems in the existing technology.

According to a first aspect, a metadata storage method is provided according to an embodiment of the present application, applied to a preset metadata storage system and includes:

obtaining a metadata to be processed from the preset metadata storage system or from external of the preset metadata storage system;

determining a type of metadata to be processed;

processing the metadata to be processed to obtain a new metadata in a storage format corresponding to the type of metadata to be processed, wherein the storage formats correspond to different types of metadata to be processed and comprise at least one identical information kind for different types of metadata; and storing the new metadata in the preset metadata storage system.

In conjunction with the first aspect, in a first implementation of the first aspect of the present application, the at least one identical information kind includes: a name of metadata to be processed, and a type of data described by the metadata to be processed.

In conjunction with the first aspect, in a second implementation of the first aspect of the present application, the type of metadata to be processed includes a structured metadata for describing a structured data, a semi-structured metadata for describing a semi-structured data, and an unstructured metadata for describing an unstructured data; and;

processing the metadata to be processed to obtain a new metadata in a storage format corresponding to the type of metadata to be processed includes:

in a case that the metadata to be processed is a structured metadata, processing the metadata to be processed to obtain a new data in a first storage format;

in a case that the metadata to be processed is a semi-structured metadata, processing the metadata to be processed to obtain a new data in a second storage format;

in case that the metadata to be processed is an unstructured metadata, processing the metadata to be processed to obtain a new data in a third storage format;

wherein the first, second and third storage formats each includes a name of metadata to be processed, and a type of data described by the metadata to be processed.

In conjunction with the first aspect, in a third implementation of the first aspect of the present application, the obtaining a metadata to be processed from the preset metadata storage system or from external of the preset metadata storage system includes:

obtaining a metadata from an external metadata storage system through a first interface, as the metadata to be processed.

In conjunction with the third implementation of the first aspect, in a fourth implementation of the first aspect of the present application, after storing the new metadata in the preset metadata storage device, wherein the method further includes:

detecting through the first interface a changing of metadata corresponding to the new metadata in the external metadata storage system; and obtaining the changed metadata through the first interface, and modifying the new metadata according to the changed metadata.

In conjunction with the third implementation of the first aspect, in a fifth implementation of the first aspect of the present application, after storing the new metadata in the preset metadata storage device, wherein the method further includes:

receiving through the first interface a metadata change message from the external metadata storage system, and modifying the new metadata according to the metadata changing message;

wherein the metadata changing message indicates that the metadata corresponding to the new metadata in the external metadata storage system is changed.

In conjunction with the fourth implementation of the first aspect, in a sixth implementation of the first aspect of the present application, the changing of the metadata corresponding to the new metadata in the external metadata storage system is detected through the first interface at a predetermined time interval.

According to a second aspect, a metadata storage device is provided according to an embodiment of the present application, applied to a preset metadata storage system, and includes:

an obtaining module configured to obtain a metadata to be processed from the preset metadata storage system or from external of the preset metadata storage system;

a determining module configured to determine the type of metadata to be processed;

a processing module configured to process the metadata to be processed to obtain a new metadata in a storage format corresponding to the type of metadata to be processed, wherein the storage formats correspond to different types of metadata to be processed and comprise at least one identical information kind for different types of metadata;

a storing module configured to store the new metadata in the preset metadata storage system.

In conjunction with the second aspect, in a first implementation of the second aspect of the present application, the type of the metadata to be processed includes a structured metadata for describing a structured data, a semi-structured metadata for describing a semi-structured data, and an unstructured metadata for describing an unstructured data; and the processing module is further configured to:

in a case that the metadata to be processed is a structured metadata, process the metadata to be processed to obtain a new data in a first storage format;

in a case that the metadata to be processed is a semi-structured metadata, process the metadata to be processed to obtain a new data in a second storage format;

in case that the metadata to be processed is an unstructured metadata, process the metadata to be processed to obtain a new data in a third storage format;

wherein the first, second and third storage formats each comprises a name of metadata to be processed, and a type of data described by the metadata to be processed.

In conjunction with the second aspect, in a second implementation of the second aspect of the present application, the at least one identical information kind includes:

a name of metadata to be processed, and a type of data described by the metadata to be processed.

In conjunction with the second aspect, in a third implementation of the second aspect of the present application, the obtaining module further includes:

obtain a metadata from an external metadata storage system through a first interface, as the metadata to be processed.

In conjunction with the second implementation of the second aspect, in a third implementation of the second aspect of the present application, the device further includes:

a first synchronizing module configured to detect through the first interface a changing of metadata corresponding to the new metadata in the external metadata storage system, obtain the changed metadata through the first interface, and modify the new metadata according to the changed metadata.

In conjunction with the third implementation of the second aspect, in a fourth implementation of the second aspect of the present application, the device further includes:

a second synchronizing module configured to receive through the first interface a metadata change message from the external metadata storage system, and modify the new metadata according to the metadata changing message;

wherein the metadata changing message indicates that the metadata corresponding to the new metadata in the external metadata storage system is changed.

In conjunction with the fourth implementation of the second aspect, in a fifth implementation of the second aspect of the present application, the first synchronizing module detects a changing of metadata at a predetermined time interval.

In a third aspect, a sever is provided according to an embodiment of the present application, wherein the server includes:

one or more processors; and a storage device configured for storing one or more programs; and a communication interface configured for enabling the processor and the storage device to communicate with an external device, wherein when the one or more programs are executed by the one or more processors, the one or more processors are caused to implement the method according to the first aspect.

According to a fourth aspect, a computer-readable storage medium is provided, according to an embodiment of the present application in which a computer program is stored, wherein the computer program, when executed by a processor, implements the method according to the first aspect.

One of the above technical solutions has the following advantages or beneficial effects:

Different types of metadata may be processed according to the type of metadata to be processed, so that the metadata to be processed may be stored in a unified format. Thus a search for metadata can be performed through a unified interface in a search engine, which is convenient for use.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
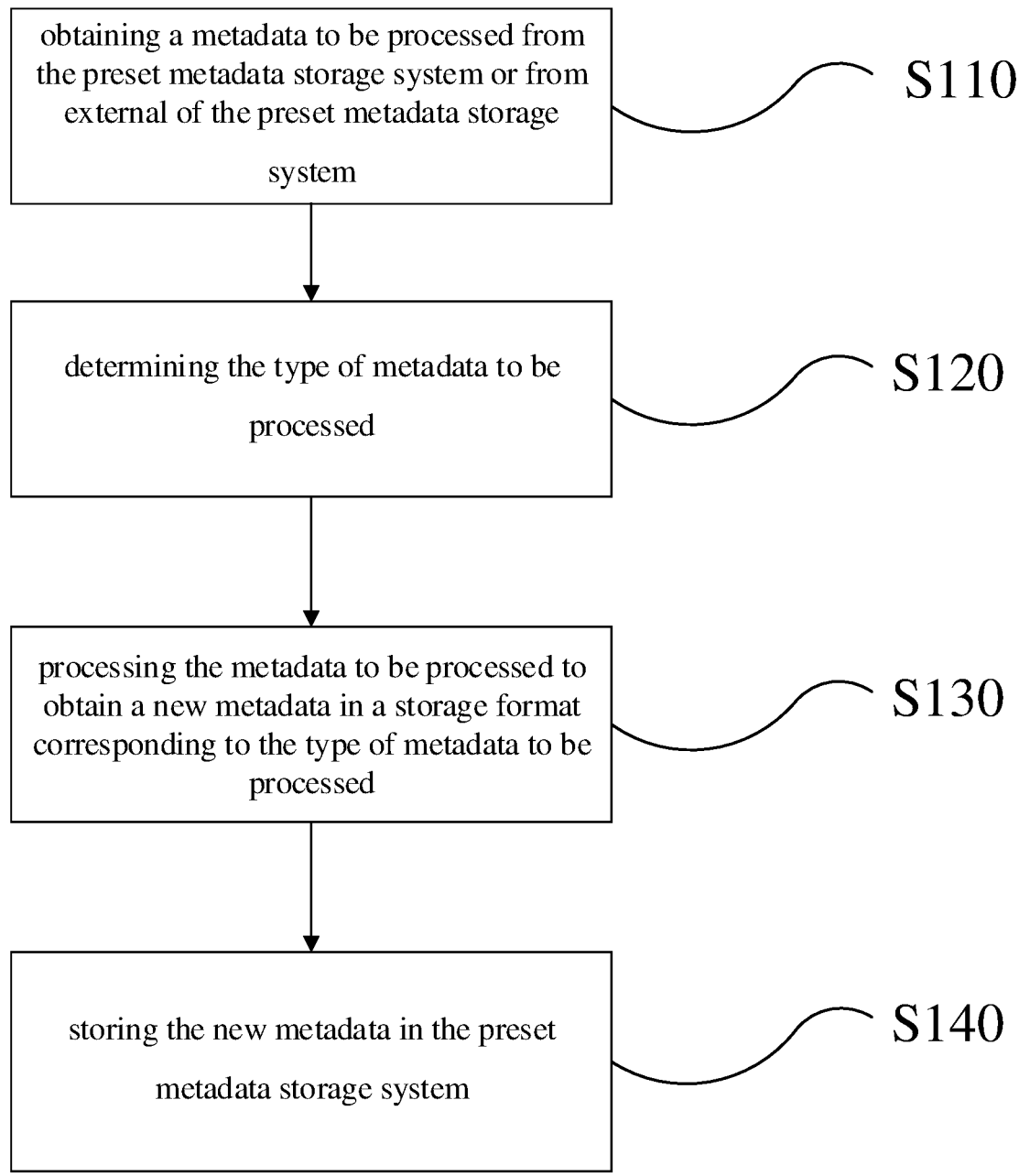
FIG. 1 is a flowchart of a metadata storage method 100 according to a first embodiment of the present application.

FIG. 1 shows a flowchart of a metadata storage method 100 according to the first embodiment of the present application. The metadata storage method 100 is applied to a preset metadata storage system. As shown in FIG. 1, the method 100 may include the steps S110-S140.

S110, obtaining a metadata to be processed from the preset metadata storage system or from external of the preset metadata storage system.

In a preferred embodiment of the present application, the metadata to be processed may be manually inputted by a user. In this case, it is understood that the user may input a metadata through a keyboard, a virtual keyboard and other ways for inputting the metadata.

In another preferred embodiment of the present application, the metadata to be processed may me a metadata from external of the preset metadata storage system, which will be specifically described below in the second embodiment of the present application.

S120, determining the type of metadata to be processed.

In a preferred embodiment of the present application, the type of the metadata to be processed includes a structured metadata, a semi-structured metadata and an unstructured metadata which are used to describe the structured metadata, the semi-structured metadata and the unstructured metadata respectively.

The structured metadata, also known as row data, is logically expressed and realized in form of a two-dimensional table structure. The structured metadata strictly follows rules regarding data format and data length, and may mainly be stored and managed through a relational database. The unstructured metadata differs from the structured metadata in that it is not suitable to be described in form of a two dimensional table structure, and includes an office document in any format, XML, HTML, any kind of statement, or an image, audio, video information, etc. The semi-structured metadata is actually the structured metadata with a structure largely changed. Because the details of the data need be obtained, the data cannot be simply organized to a file as the unstructured metadata. Because of a large change in structure, a table cannot simply be created corresponding to the metadata.

S130, processing the metadata to be processed to obtain a new metadata in a storage format corresponding to the type of metadata to be processed, wherein the storage formats correspond to different types of metadata to be processed and comprise at least one identical information kind for different types of metadata.

In order to realize the unified storage and management of the metadata, the obtained metadata needs to be processed. In this embodiment, different types of metadata may be processed through different storage formats respectively. It is understood that in different storage formats, at least one identical information kind should be included in order to realize the unified storage and management. In a preferred embodiment of the present application, the at least one identical information kind may include a name of a metadata, and a type of data described by a metadata, for example, a structured metadata, a semi-structured metadata and an unstructured metadata.

In a case that the metadata include a structured metadata, a semi-structured metadata and an unstructured metadata, S130 may include:

in a case that the metadata to be processed is a structured metadata, processing the metadata to be processed to obtain a new data in a first storage format;

in a case that the metadata to be processed is a semi-structured metadata, processing the metadata to be processed to obtain a new data in a second storage format;

in case that the metadata to be processed is an unstructured metadata, processing the metadata to be processed to obtain a new data in a third storage format.

The first, second and third storage formats each may include a name of metadata to be processed and a type of data described by the metadata to be processed.

S140, storing the new metadata in the preset metadata storage system.

It is understood that, after performing the steps S110-S140, the obtained new metadata may form a new metadata storage system. The existing metadata storage systems are configured to store only one type of metadata respectively, and is not in data communication with each other. Therefore, when a query engine is used to search for a metadata, the query engine is needed to be modified according to the metadata storage system in order with which the engine is in communication, to provide a corresponding interface. In the metadata storage method provided by the first embodiment, a new metadata may be obtained after processing the metadata in a predetermined storage format. Therefore, a new metadata storage system may be formed, facilitating to provide a unified interface and enabling a convenient search.

Figure 2:
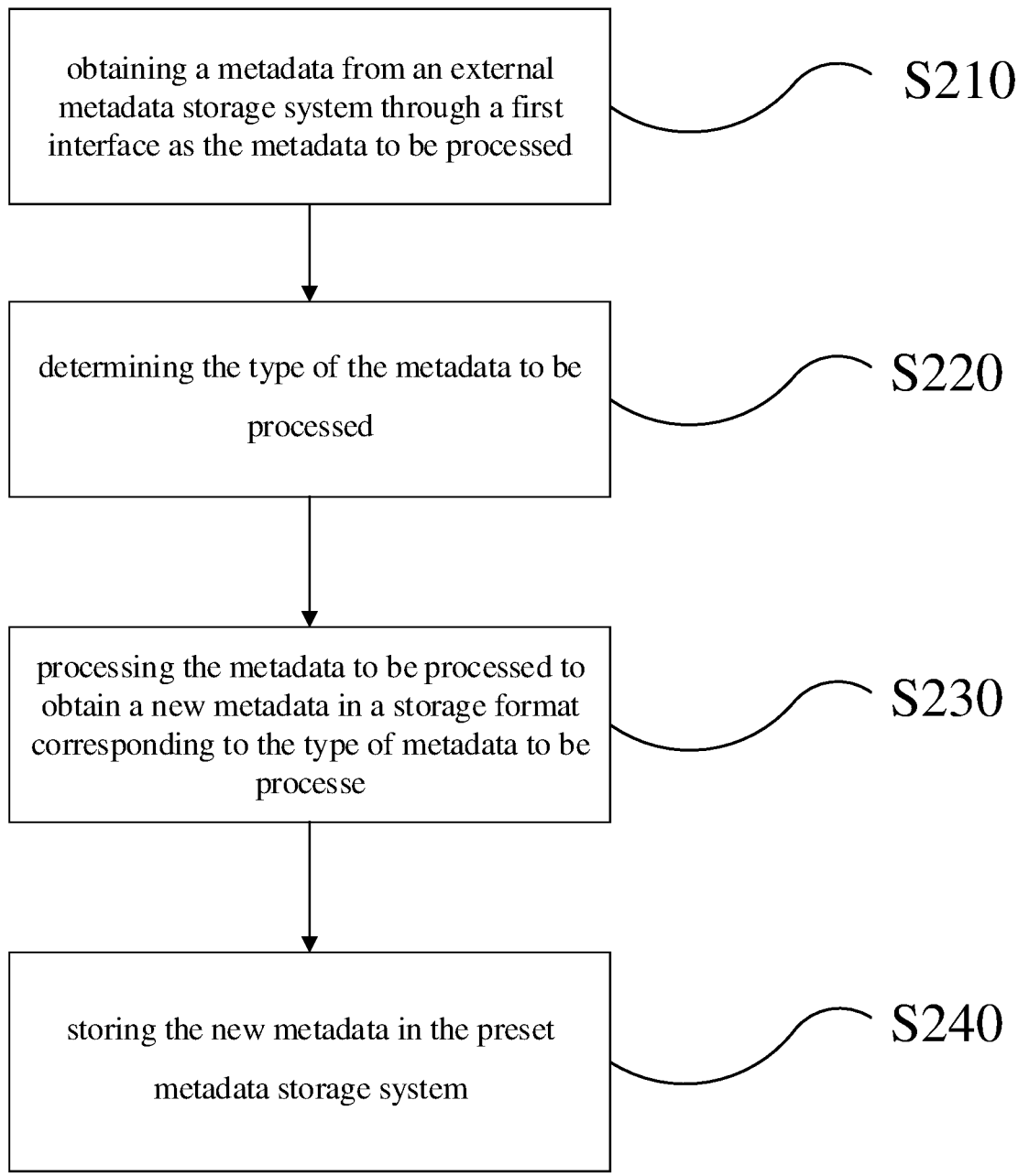
FIG. 2 is a flowchart of a metadata storage method 200 according to a second embodiment of the present application.

FIG. 2 shows a flowchart of a metadata storage method 200 according to the second embodiment of the present application. As shown in FIG. 2, the metadata storage method 200 may include the steps S210-S240.

S210, obtaining a metadata from an external metadata storage system through a first interface as the metadata to be processed.

In an embodiment of the present application, the metadata to be processed is obtained from an external metadata storage system. It is be understood that there may be one or more external metadata storage systems. In a preferred embodiment of the present application, there may be a plurality of external metadata storage systems.

S220, determining the type of the metadata to be processed.

S230, processing the metadata to be processed to obtain a new metadata in a storage format corresponding to the type of metadata to be processed, wherein the storage formats correspond to different types of metadata to be processed and comprise at least one identical information kind for different types of metadata.

S240, storing the new metadata in the preset metadata storage system.

The steps S220-S240 are identical with the steps S120-S140, and will not be described here.

It is understood that the metadata storage format of an external metadata storage system may be different from that of another, which is inconvenient to use. In an embodiment of the present application, a metadata is obtained from an external metadata storage system through the first interface and is stored in a unified manner, thus facilitating a unified management of the metadata and the use by a user.

Figure 3:
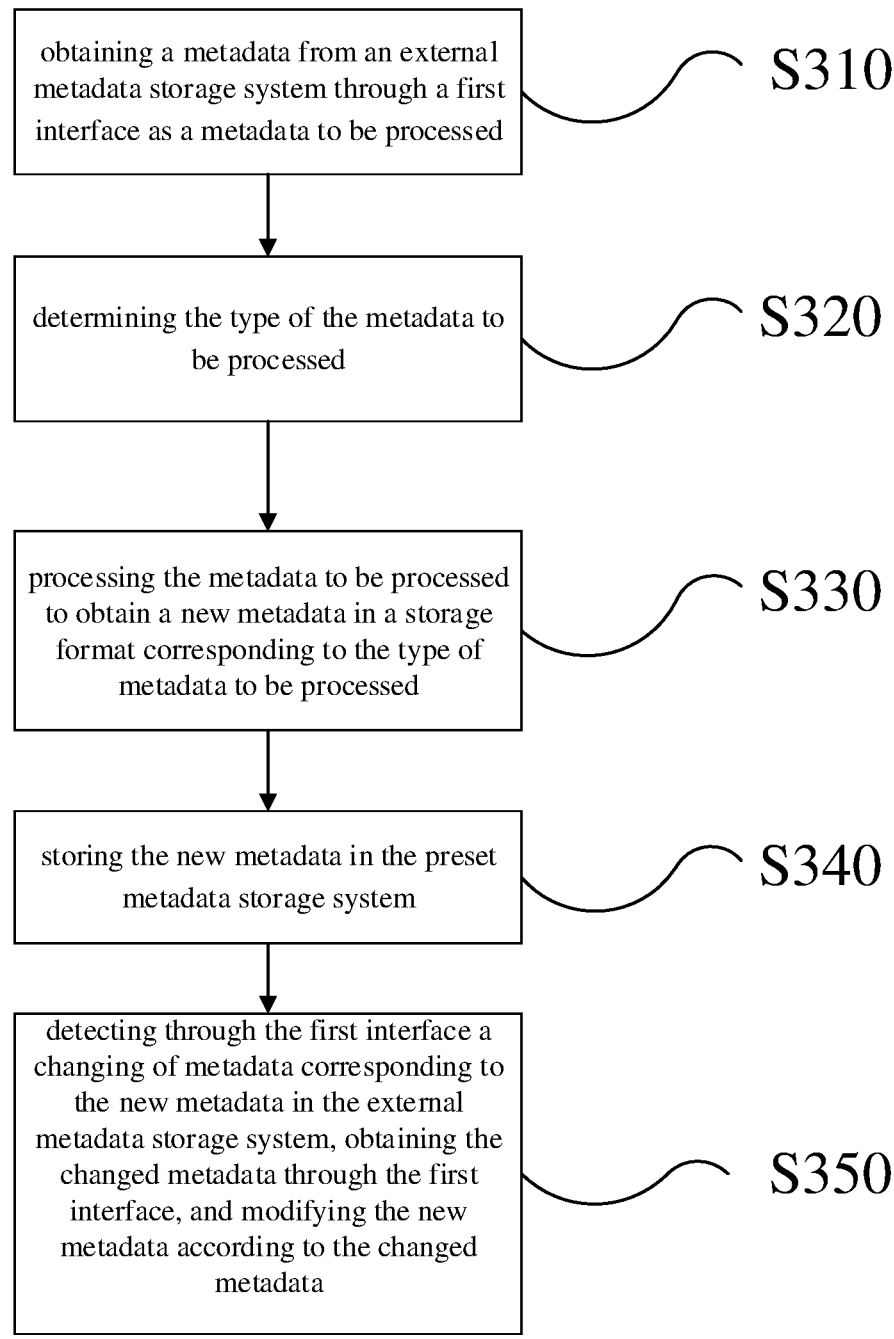
FIG. 3 is a flowchart of a metadata storage method 300 according to a third embodiment of the present application.

FIG. 3 shows a flowchart of a metadata storage method 300 according to the third embodiment of the present application. As shown in FIG. 3, the method 300 may include the steps S310-S340.

S310, obtaining a metadata from an external metadata storage system through a first interface as a metadata to be processed.

S320, determining the type of the metadata to be processed.

S330, processing the metadata to be processed to obtain a new metadata in a storage format corresponding to the type of metadata to be processed, wherein the storage formats correspond to different types of metadata to be processed and comprise at least one identical information kind for different types of metadata.

S340, storing the new metadata in the preset metadata storage system.

The steps S310-S340 are identical with the steps S210-S240, and will not be described here. In addition, the method 300 further includes:

S350, detecting through the first interface a changing of metadata corresponding to the new metadata in the external metadata storage system; and obtaining the changed metadata through the first interface, and modifying the new metadata according to the changed metadata.

S350 is actually a process for synchronizing metadata. Since the metadata obtained from the external metadata storage system has further been stored in a new format in the preset metadata system, the metadata in the new format in the preset metadata storage system should be changed in a case that a corresponding metadata in the external metadata storage system is changed. In an embodiment of the present application, S350 may be performed at a predetermined time interval in order to perform a timing synchronization of the metadata in the preset metadata storage system and the external metadata storage system.

Figure 4:
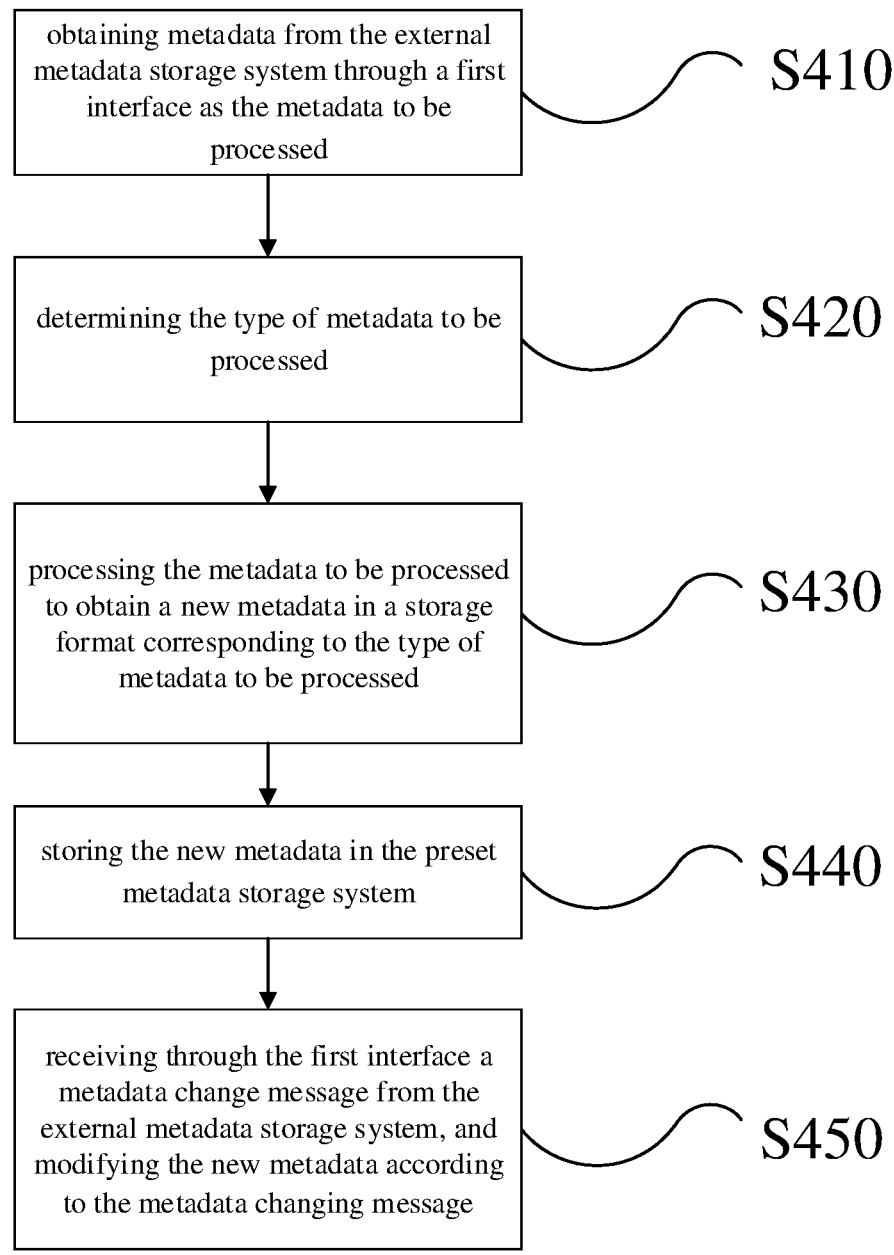
FIG. 4 is a flowchart of a metadata storage method 400 according to a fourth embodiment of the present application.

FIG. 4 shows a flowchart of a metadata storage method 400 according to the fourth embodiment of the present application. As shown in FIG. 4, the method 400 may include the steps S410-S440.

S410, obtaining metadata from the external metadata storage system through a first interface as the metadata to be processed.

S420, determining the type of metadata to be processed.

S430, processing the metadata to be processed to obtain a new metadata in a storage format corresponding to the type of metadata to be processed, wherein the storage formats correspond to different types of metadata to be processed and comprise at least one identical information kind for different types of metadata.

S440, storing the new metadata in the preset metadata storage system.

Steps S410-S440 are identical with Steps S210-S240, and will not be described here. In addition, the method 400 further includes:

S450, receiving through the first interface a metadata change message from the external metadata storage system, and modifying the new metadata according to the metadata changing message;

wherein the metadata changing message indicates that the metadata corresponding to the new metadata in the external metadata storage system is changed.

The S450 is similar to the S350 and will not be described here.

By performing the method 300 and the method 400, a synchronization of the metadata both in the preset metadata storage system and in the external metadata storage system can be performed. When the metadata in the external metadata storage system is changed, the corresponding metadata in the preset metadata system is also changed, so that the metadata in the preset metadata system can be updated.

For the methods 100 to 400, in accordance with a preferred embodiment of the present application, the first storage format may include the following information:

a) a unique global name (identifier);
b) the type of data described (structured data herein);
c) the schema of the described data;
d) the storage location of the described data;
e) the storage mode of the described data;
f) the serialized deserialization mode of the described data;
g) the access right to the described data of a user;

The second storage format may include the following information:

a) a unique global name (identifier);
b) the type of data described (semi-structured data herein);
c) the specific type of data described (eg text, json, etc.);
d) an essential parameter related to the specific type of data described;
e) the access right to the described data of a user;

The third storage format may include the following information:

a) a unique global name (identifier);
b) the type of data described (unstructured data herein);
c) the specific type of data described;
d) an essential parameter related to the specific type of data described;
e) the access right to the described data of a user.

At this time, the at least one identical information kind is the unique global name, the type of data described data and the access right to the described data of a user. But it is understood that the at least one identical information kind may include one or more kinds of the above three, and may also include another kind of information.

In a preferred embodiment of the present application, take the case in which the identical information is the name of the metadata to be processed and the type of data described by the metadata to be processed as an example, for an engine to use the preset metadata storage system, a unified get_table interface may be provided, in order to return information of the metadata. For example, for structured metadata A, it is only necessary to obtain its name and the type of data describe by the metadata (structured data, for example), and then the other information corresponding to the metadata A may be obtained by calling get_table (A).

Figure 5:
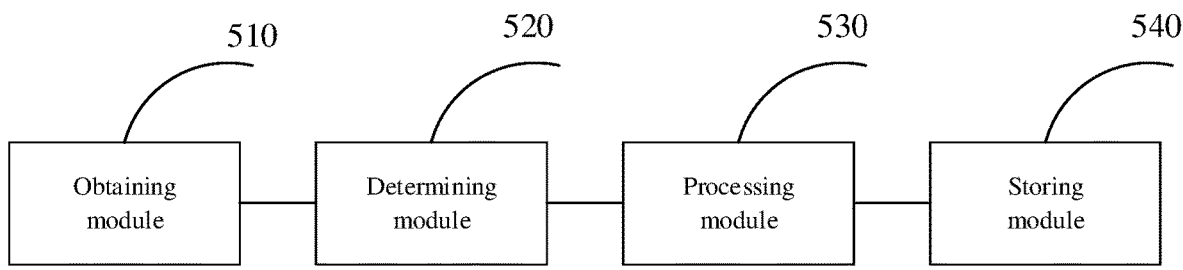
FIG. 5 is a schematic structural diagram of a metadata storage device 500 according to a fifth embodiment of the present application.

FIG. 5 shows a schematic structural diagram of a metadata storage device 500 according to a fifth embodiment of the present application. As shown in FIG. 5, the metadata storage device includes: an obtaining module 510, a determining module 520, a processing module 530 and a storing module; wherein the obtaining module 510 is configured to obtain a metadata to be processed from the preset metadata storage system or from external of the preset metadata storage system;

the determining module 520 is configured to determine the metadata to be processed;

the processing module 530 is configured to process the metadata to be processed to obtain a new metadata in a storage format corresponding to the type of metadata to be processed, wherein the storage formats correspond to different types of metadata to be processed and comprise at least one identical information kind for different types of metadata; and the storing module 540 is configured to store the new metadata in the preset metadata storage system.

In an embodiment of the present application, the type of the metadata to be processed includes a structured metadata for describing a structured data, a semi-structured metadata for describing a semi-structured data, and an unstructured metadata for describing an unstructured data.

Moreover, the processing module is further configured to:

in a case that the metadata to be processed is a structured metadata, process the metadata to be processed to obtain a new data in a first storage format;

in a case that the metadata to be processed is a semi-structured metadata, process the metadata to be processed to obtain a new data in a second storage format;

in case that the metadata to be processed is an unstructured metadata, process the metadata to be processed to obtain a new data in a third storage format;

wherein the first, second and third storage formats each comprises a name of metadata to be processed, and a type of data described by the metadata to be processed.

In another embodiment of the present application, the obtaining module 510 is further used to obtain a metadata from an external metadata storage system through a first interface, as the metadata to be processed.

Figure 6:
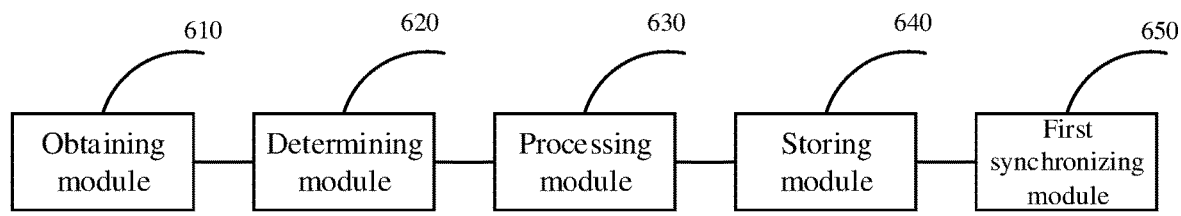
FIG. 6 is a schematic structural diagram of a metadata storage device 600 according to a sixth embodiment of the present application.

FIG. 6 shows a schematic structural diagram of a metadata storage device 600 according to a sixth embodiment of the present application. As shown in FIG. 6, the metadata storage device includes: an obtaining module 610, a determining module 620, a processing module 630, a storing module 640, and a first synchronizing module 650.

The obtaining module 610 configured to obtain a metadata to be processed from the preset metadata storage system or from external of the preset metadata storage system.

The determining module 620 configured to determine the metadata to be processed.

The processing module 630 is configured to process the metadata to be processed to obtain a new metadata in a storage format corresponding to the type of metadata to be processed, wherein the storage formats correspond to different types of metadata to be processed and comprise at least one identical information kind for different types of metadata.

The storing module 640 is configured to store the new metadata in the preset metadata storage system.

The first synchronizing module 650 is configured to detect through the first interface a changing of metadata corresponding to the new metadata in the external metadata storage system, obtain the changed metadata through the first interface, and modify the new metadata according to the changed metadata.

The first synchronizing module 650 may detect the changing of the metadata at a predetermined time interval.

Figure 7:
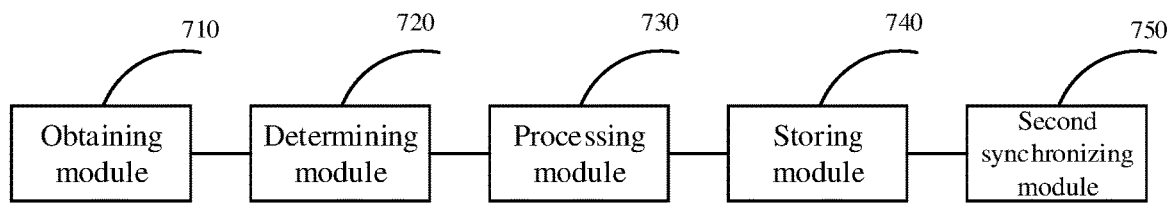
FIG. 7 is a schematic structural diagram of a metadata storage device 700 according to a seven embodiment of the present application.

FIG. 7 shows a schematic structural diagram of a metadata storage device 700 according to a seventh embodiment of the present application. As shown in FIG. 7, the metadata storage device includes: an obtaining module 710, a determining module 720, a processing module 730, a storing module 740, and a second synchronizing 750.

The obtaining module 710 configured to obtain a metadata to be processed from the preset metadata storage system or from external of the preset metadata storage system.

The determining module 720 configured to determine the metadata to be processed.

The processing module 730 is configured to process the metadata to be processed to obtain a new metadata in a storage format corresponding to the type of metadata to be processed, wherein the storage formats correspond to different types of metadata to be processed and comprise at least one identical information kind for different types of metadata.

The storing module 740 is configured to store the new metadata in the preset metadata storage system.

The second synchronizing module 750 is configured to receive through the first interface a metadata change message from the external metadata storage system, and modify the new metadata according to the metadata changing message; wherein the metadata changing message indicates that the metadata corresponding to the new metadata in the external metadata storage system is changed.

Figure 8:
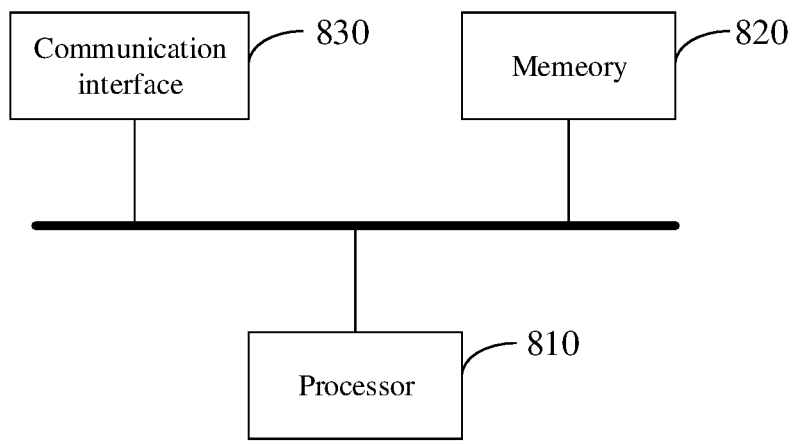
FIG. 8 is a schematic diagram of a server according to an eighth embodiment of the present application.

FIG. 8 shows a server according to an eighth embodiment of the present application. As shown in FIG. 8, the server includes a memory 810 and a processor 820. The memory 810 stores a computer program executable on the processor 820. When the processor 820 executes the computer program, the information exchanging method in the foregoing embodiment is implemented. The number of the memory 810 and the processor 820 may be one or more.

The server further includes: a communication interface 830 configured to communicate with external devices and exchange data; and a memory 810 which may include a high-speed RAM memory and may also include a non-volatile memory, such as at least one magnetic disk memory.

If the memory 810, the processor 820, and the communication interface 830 are implemented independently, the memory 810, the processor 820, and the communication interface 830 may be connected to each other through a bus and communicate with each other. The bus may be an ISA (Industry Standard Architecture) bus, a PCI (Peripheral Component) bus, an EISA (Extended Industry Standard Component) bus, or the like. The bus may be divided into an address bus, a data bus, a control bus, and the like. For ease of illustration, only one bold line is shown in FIG. 8, but it does not mean that there is only one bus or one type of bus.

Optionally, in a specific implementation, if the memory 810, the processor 820, and the communication interface 830 are integrated on one chip, the memory 810, the processor 820, and the communication interface 830 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A metadata storage method, applied to a preset metadata storage system, comprising:
   obtaining different types of metadata to be processed, manually inputted by a user or from external of the preset metadata storage system;
   determining types of the different types of metadata to be processed;
   processing the different types of metadata to be processed to obtain a new metadata in different storage formats corresponding to the different types of metadata to be processed, wherein each of the different storage formats comprises at least one identical information kind for the different types of metadata to be processed, wherein the different types of metadata are processed into different storage formats, respectively; wherein the at least one identical information kind comprises: a name of metadata to be processed, and a type of data described by the metadata to be processed; and
   storing the new metadata in the preset metadata storage system, wherein the different types of metadata having respectively different storage formats are stored in the preset metadata storage system.

2. The method according to claim 1, wherein the types of the different types of metadata to be processed comprise a structured metadata for describing a structured data, a semi-structured metadata for describing a semi-structured data, and an unstructured metadata for describing an unstructured data; and
   processing the different types of metadata to be processed to obtain a new metadata in different storage formats corresponding to the different types of metadata to be processed comprises:
   in a case that a metadata to be processed is a structured metadata, processing the metadata to be processed to obtain a new data in a first storage format;
   in a case that a metadata to be processed is a semi-structured metadata, processing the metadata to be processed to obtain a new data in a second storage format;
   in a case that a metadata to be processed is an unstructured metadata, processing the metadata to be processed to obtain a new data in a third storage format;
   wherein the first, second and third storage formats each comprises the name of metadata to be processed, and the type of data described by the metadata to be processed.

3. The method according to claim 1, wherein the obtaining different types of metadata to be processed, manually inputted by a user or from external of the preset metadata storage system comprises:
- obtaining a metadata from an external metadata storage system through a first interface, as a metadata to be processed.

4. The method according to claim 3, wherein after storing the new metadata in the preset metadata storage device, the method further comprises:
- detecting through the first interface a changing of metadata corresponding to the new metadata in the external metadata storage system; and
- obtaining the changed metadata through the first interface, and modifying the new metadata according to the changed metadata.

5. The method according to claim 3, wherein after storing the new metadata in the preset metadata storage device, the method further comprises:
- receiving through the first interface a metadata change message from the external metadata storage system, and modifying the new metadata according to the metadata changing message;
- wherein the metadata changing message indicates that the metadata corresponding to the new metadata in the external metadata storage system is changed.

6. The method according to claim 4, wherein the changing of the metadata corresponding to the new metadata in the external metadata storage system is detected through the first interface at a predetermined time interval.

7. A metadata storage device, applied to a preset metadata storage system, comprising:
- one or more processors,
- a storage device for storing one or more programs,
- the one or more programs, when executed by the one or more processors, enable the one or more processors to:
  - obtain different types of metadata to be processed, manually inputted by a user or from external of the preset metadata storage system;
  - determine types of the different types of metadata to be processed;
  - process the different types of metadata to be processed to obtain a new metadata in different storage formats corresponding to the different types of metadata to be processed, wherein each of the different storage formats comprises at least one identical information kind for the different types of metadata to be processed, wherein the different types of metadata are processed into different storage formats, respectively; wherein the at least one identical information kind comprises: a name of metadata to be processed, and a type of data described by the metadata to be processed; and
  - store the new metadata in the preset metadata storage system, wherein the different types of metadata having respectively different storage formats are stored in the preset metadata storage system.

8. The device according to claim 7, wherein the types of the different types of metadata to be processed comprise a structured metadata for describing a structured data, a semi-structured metadata for describing a semi-structured data, and an unstructured metadata for describing an unstructured data; and
- the one or more programs, when executed by the one or more processors, enable the one or more processors further to:
- in a case that a metadata to be processed is a structured metadata, process the metadata to be processed to obtain a new data in a first storage format;
- in a case that a metadata to be processed is a semi-structured metadata, process the metadata to be processed to obtain a new data in a second storage format;
- in case that a metadata to be processed is an unstructured metadata, process the metadata to be processed to obtain a new data in a third storage format;
- wherein the first, second and third storage formats each comprises the name of metadata to be processed, and the type of data described by the metadata to be processed.

9. The device according to claim 7, wherein the one or more programs, when executed by the one or more processors, enable the one or more processors further to:
- obtain a metadata from an external metadata storage system through a first interface, as a metadata to be processed.

10. The device according to claim 9, wherein the one or more programs, when executed by the one or more processors, enable the one or more processors further to:
- detect through the first interface a changing of metadata corresponding to the new metadata in the external metadata storage system, obtain the changed metadata through the first interface, and modify the new metadata according to the changed metadata.

11. The device according to claim 9, wherein the one or more programs, when executed by the one or more processors, enable the one or more processors further to:
- receive through the first interface a metadata change message from the external metadata storage system, and modify the new metadata according to the metadata changing message;
- wherein the metadata changing message indicates that the metadata corresponding to the new metadata in the external metadata storage system is changed.

12. The device according to claim 10, wherein the one or more programs, when executed by the one or more processors, enable the one or more processors further to detect a changing of metadata at a predetermined time interval.

13. A non-transitory computer-readable storage medium, in which a computer program is stored, wherein the computer program, when executed by a processor, implements the method of claim 1.

* * * * *